Figures 1, 2:
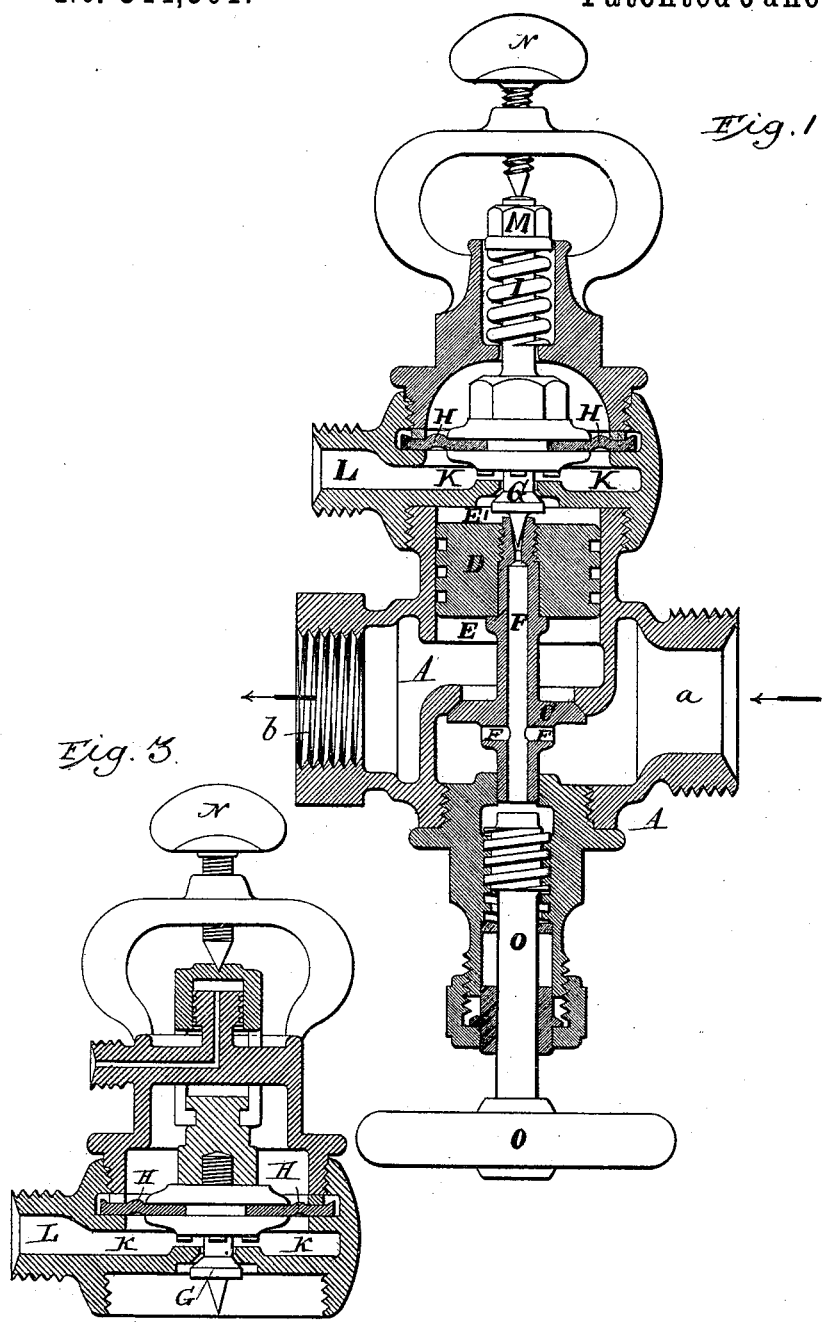

(No Model.) 2 Sheets—Sheet 1.

L. SCHUTTE.
AUTOMATIC STOP VALVE.

No. 344,501. Patented June 29, 1886.

Witnesses:
Wm. Kennedy
Wm. H. Shipley

Inventor:
Louis Schutte
By his Atty. T. S. Dodge

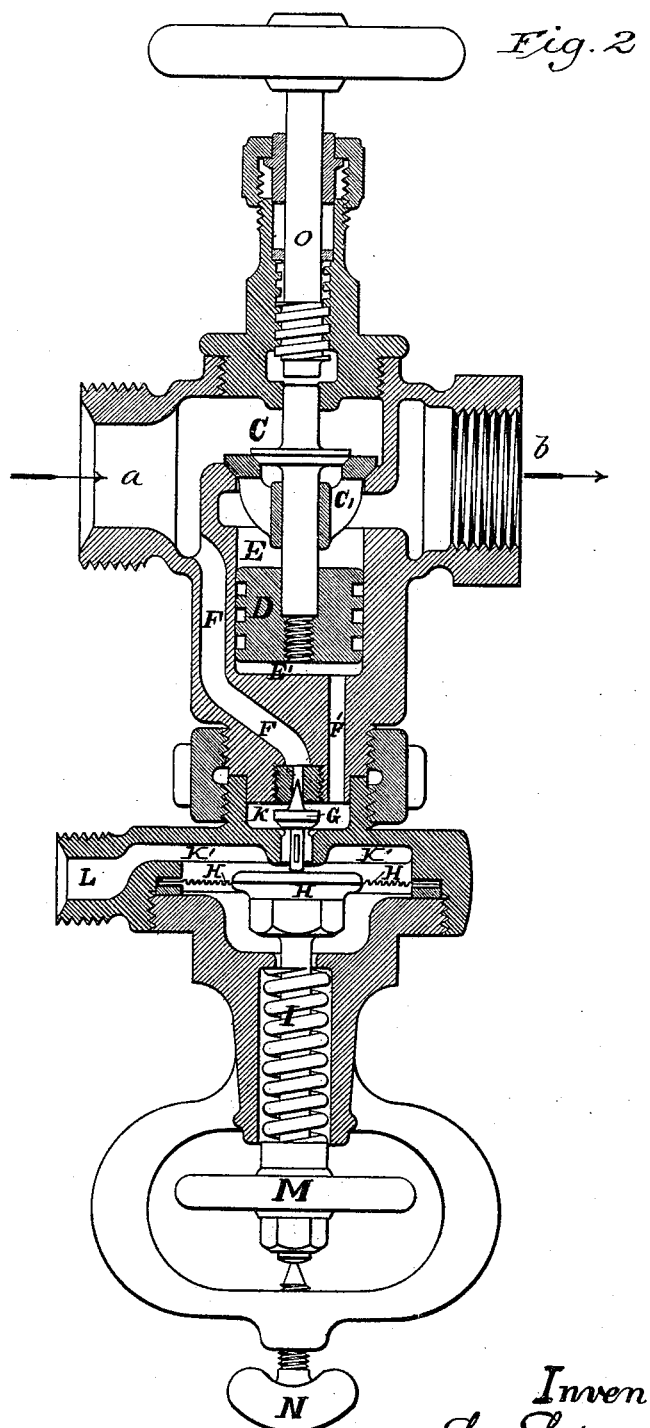

UNITED STATES PATENT OFFICE.

LOUIS SCHUTTE, OF PHILADELPHIA, PENNSYLVANIA.

AUTOMATIC STOP-VALVE.

SPECIFICATION forming part of Letters Patent No. 344,501, dated June 29, 1886.

Application filed January 18, 1886. Serial No. 188,941. (No model.)

*To all whom it may concern:*

Be it known that I, LOUIS SCHUTTE, of Philadelphia, in the county of Philadelphia and State of Pennsylvania, have invented certain Improvements in Automatic Stop-Valves, of which the following is a specification.

The aim of my invention is to provide a valve which will be positively opened and closed in consequence of variations of a vacuum or a fluid-pressure.

It relates to a stop-valve the opening and closing of which is effected by fluid-pressure controlled by an auxiliary valve, which is in turn opened and closed by variations in a fluid-pressure, or in a pressure and vacuum, with which it communicates. The opening of this auxiliary valve admits a fluid under pressure behind a piston attached to the main valve, and opens the latter positively, while the closing of the auxiliary valve stops the admission of fluid into the cylinder and permits the contained fluid to escape to the atmosphere or into a vacuum, whereupon the main valve is closed by the pressure on the inner side of the piston.

Figures 1 and 2 of the drawings illustrate in central vertical section two forms of my valve, and Fig. 3 a modification.

Referring to Fig. 1, A represents the body of the valve, provided with an inlet-throat, *a*, and an outlet-throat, *b*, which communicates with each other through a throat or valve-seat.

C represents the main valve, similar in form to an ordinary puppet or check valve, by which the throat is closed to prevent the passage of the fluid through the body. At one end the valve-spindle is secured to a piston, D, which works closely in a cylinder formed at one side of the body, and opening at its inner end into the latter at the delivery side. The outer end of the cylinder above the piston is closed by a suitable cap or covering, and communicates through a central throat with a chamber, K, communicating in turn, through throat L, with a vacuum-chamber or a source of fluid-pressure supply. The main valve C has its spindle F made of tubular form, with lateral openings at the receiving side of the valve, so that the fluid entering the throat *a* may pass thence through the spindle into the cylinder behind or above the piston D. As the area of the piston is greater than that of the valve, it follows that the fluid admitted to the cylinder acts to depress the piston and operate the main valve C in a positive manner.

For the purpose of controlling the admission of the fluid into the cylinder, I employ a valve, G, which is extended upward through the opening in the top of the cylinder and attached to a flexible diaphragm, H, or a piston forming a part of the upper wall of the chamber K. The spindle of the valve G is continued upward through an opening in the case or body, and surrounded at its outer end by a spring, I, which latter is seated at one end against the body, and at the other end against the inner side of a nut, M, applied to the extremity of the spindle. The spring thus applied tends to lift the diaphragm and the valve G, so as to open the end of the spindle F and admit the fluid-pressure behind the piston, for the purpose of opening the main valve. When the valve G is lifted to open the spindle, it closes the throat or passage between the cylinder and the chamber K, so that the fluid entering the cylinder through the main spindle is confined therein. During the maintenance of the vacuum with which the chamber K communicates the diaphragm H is held down by the atmospheric pressure on its upper surface, and the valve G caused to maintain the closure of the spindle F, so that the main valve C will remain in a closed condition. When, however, the vacuum ceases or falls below the predetermined limit in the chamber K, the spring I overcomes the atmospheric pressure, and, lifting the diaphragm and valve G, opens the end of the spindle F, so that the fluid will enter the cylinder and open the main valve, as before explained.

The valve operated and constructed as above is adapted for many uses, but is of particular advantage for controlling the supply of live steam to those steam-jet condensers which are ordinarily operated by exhaust or low-pressure steam. In condensers of this class a vacuum is maintained during the continuance of the exhaust-steam supply, and live steam is demanded only in maintaining the operation of the apparatus when the supply of exhaust-steam is cut off.

By applying my valve and connecting the throat L with the vacuum-chamber of the condenser live steam will be supplied automatically whenever the vacuum fails, and its delivery automatically stopped as soon as the vacuum is again established.

Referring to Fig. 2, it will be seen that the body is provided with inlet and outlet throats $a$ and $b$, and with a main valve, C, consisting of two concentric valves of different diameters. The inner valve is adapted to lift independently of the outer, in a manner familiar to every skilled mechanic. The main-valve spindle, which is in this case made solid, is secured to a piston mounted in a cylinder communicating at the inner end with the delivery side of the body, as in the first example. The outer closed end of the cylinder communicates by a passage, F', with a chamber, K, which in turn communicates through a second passage, F, with the receiving-throat of the body, so that fluid entering the throat $a$ may flow thence, through the passage F, chamber K, and passage F', into the cylinder behind the piston, so as to force the valve open. The spindle is attached to the central portion of the valve, which, being of small area, is easily lifted. After the communication is established through this central opening and the pressure substantially equalized on the two sides of the valve the piston encounters the outer section of the valve and raises it, in turn, from the seat, thus fully opening the throat or passage. The delivery of the fluid into the cylinder for opening the valve is controlled, as in the first example, by a valve, G, which closes the mouth of the passage F. This valve is connected, as in the first form, to a flexible diaphragm, H, forming part of the outer wall of the chamber K, and subjected to atmospheric pressure on its outer side. A spindle extending from this diaphragm is provided with a spiral spring, I, and adjusting-nut M, which tend, as in the first device, to open the valve G. During the maintenance of the vacuum in chamber K the atmospheric pressure on the outer side of the diaphragm H overcomes the spring I and holds the valve G closed, so that the main valve will remain closed under the pressure of the fluid acting thereon. When the vacuum in chamber K ceases, the spring I opens the valve G, and the fluid passes from throat $a$ into the cylinder, opening the main valve, as before explained.

In each form of the valve I propose to provide a threaded spindle, O, passing through a stuffing-box, and acting at its inner end on the main valve to hold the same positively closed when required.

The tension of the spring I may be varied by adjusting the nut M, so as to cause the opening of the main valve when the vacuum reaches any desired limit.

For the purpose of holding the valve G positively in a closed condition, so as to prevent the possible opening of the main valve, I provide a nut, M, seated in the frame or body and acting against the outer end of the diaphragm-spindle.

While I prefer to make use of the spring I as a means of retracting the valve G and the diaphragm, I may employ, as shown in Fig. 3, a piston on the diaphragm-spindle in connection with a cylinder communicating with a source of fluid-pressure supply.

It will be observed that the construction of the main valve in two parts, with the piston attached to the central and smaller part, permits the use of a piston of less diameter than the outer portion of the valve, so that the piston may be passed through the valve-throat to its place in the cylinder. This is a valuable feature, in that it permits the valve-body and the cylinder, with the closed cylinder, to be cast in one piece, as represented in Fig. 2.

In place of the diaphragm H, a single piston may be employed, the flexible diaphragm and the piston being well-known mechanical equivalents.

I am aware that a valve opening with or in the direction of the current controlled thereby has been combined with a piston to effect its closure, the action of the fluid on the piston being controlled by a second piston or diaphragm. It is to be noted that in my structure the main valve closes with or in the direction of the current, and that the piston is applied to effect its opening movement.

Having thus described my invention, what I claim is—

1. The main valve, closing in the direction of the current which it controls, its piston, and the cylinder for the latter, in combination with the auxiliary valve, controlling the action of a fluid on the piston to move the main valve, and a diaphragm or its described equivalent, controlled by fluid-pressure, to operate the auxiliary valve.

2. The valve-body having the main inlet and outlet openings $a\ b$, the main valve C, arranged to open against the current controlled thereby, its piston B, the cylinder containing said piston, the fluid-passage from the inlet side of the body to the cylinder, the auxiliary valve to control said passage, the chamber K, having the yielding wall H, connected with the auxiliary valve, and the spring tending to open the auxiliary valve, said elements combined for joint operation substantially as described.

3. The main valve, the piston, and cylinder, whereby fluid-pressure may be applied to open the valve, the fluid-passage on the receiving side of the valve to the cylinder, the valve G, controlling said passage, the chamber K and its diaphragm H, connected to the valve G, and the spring I, tending to urge the diaphragm outward and hold the valve G open, whereby the main valve is caused to remain closed during the continuance of a vacuum in the chamber K, but automatically opened when the vacuum in chamber K is destroyed.

4. In combination with the main valve, opening against the fluid-pressure, its piston, and cylinder, and the passage from the receiving side of the body to the cylinder, the valve G, its controlling-diaphragm, and a locking device, N, for holding the valve G positively in a closed position, to prevent the opening of the main valve.

5. In combination with a valve-throat, a puppet-valve consisting of two independent movable parts, substantially as described, a cylinder, and a valve-operating piston attached to one part of the valve.

6. A valve-body having the main-valve seat and the cylinder of a diameter as small as or smaller than that of the seat, in combination with a piston adapted to pass through the side or throat to the cylinder, and the two-part puppet-valve having one of its parts connected to the cylinder, whereby the use of a piston smaller than the valve is permitted and the construction of the body simplified.

In testimony whereof I hereunto set my hand, this 15th day of December, 1885, in the presence of two attesting witnesses.

LOUIS SCHUTTE.

Witnesses:
DANIEL HILDRETH,
FRANK SPILLIN.